United States Patent
Mayes et al.

(10) Patent No.: US 11,027,377 B2
(45) Date of Patent: Jun. 8, 2021

(54) RING INSTALLATION DEVICE

(71) Applicant: DELPHI TECHNOLOGIES IP LIMITED, St. Michael (BB)

(72) Inventors: Brian Mayes, Hilton, NY (US); Thomas J. Strauss, Spencerport, NY (US)

(73) Assignee: DELPHI TECHNOLOGIES IP LIMITED

( * ) Notice: Subject to any disclaimer, the term of this patent is extended or adjusted under 35 U.S.C. 154(b) by 238 days.

(21) Appl. No.: 16/382,899

(22) Filed: Apr. 12, 2019

(65) Prior Publication Data
US 2020/0324377 A1 Oct. 15, 2020

(51) Int. Cl.
*B23P 19/08* (2006.01)
*B25B 27/00* (2006.01)

(52) U.S. Cl.
CPC ........ *B23P 19/084* (2013.01); *B25B 27/0028* (2013.01)

(58) Field of Classification Search
CPC ........... Y10T 29/4987; Y10T 29/53657; Y10T 29/5363; Y10T 29/53478; B23Q 1/01; B23Q 1/012; B23Q 1/017; B23Q 1/25; B23Q 1/56; B23Q 1/60; B23Q 1/62; B23Q 1/601; B23Q 1/606; B23Q 1/608; B23Q 1/621; B23Q 1/626; B23Q 1/628; B23Q 7/06; B23P 19/08; B23P 19/084; B25B 27/0028; B25B 27/06; B25B 27/062; B25B 27/064; B25B 27/28
See application file for complete search history.

(56) References Cited

U.S. PATENT DOCUMENTS

| | | | |
|---|---|---|---|
| 3,665,578 A | 5/1972 | Jaquette | |
| 3,713,199 A | 1/1973 | Jaquette | |
| 5,862,578 A * | 1/1999 | Castleman | B23P 19/084 29/235 |
| 5,956,830 A * | 9/1999 | Imbus | B23P 19/084 29/229 |
| 6,012,209 A * | 1/2000 | Whetstone | B23P 19/084 29/235 |
| 6,397,446 B1 * | 6/2002 | Whetstone | B23P 19/084 29/235 |
| 6,640,784 B1 | 11/2003 | Sims | |
| 7,047,618 B2 | 5/2006 | Hunter | |
| 9,178,177 B2 * | 11/2015 | Yamazaki | H01L 27/3258 |
| 2003/0097744 A1 | 5/2003 | Rullmann et al. | |

(Continued)

Primary Examiner — Tyrone V Hall, Jr.
(74) Attorney, Agent, or Firm — Joshua M. Haines

(57) ABSTRACT

A ring installation device for installing a ring to a part includes an inner mandrel which is tapered in order to expand the ring. An outer mandrel is tubular such that the inner mandrel is received within the outer mandrel and such that the inner mandrel is moveable within the outer mandrel along an axis. A ring stripper is tubular such that the outer mandrel is receive within the ring stripper and such that the outer mandrel is moveable within the inner mandrel along the axis. The inner mandrel is moveable along the axis relative to the outer mandrel and the ring stripper from an inner mandrel first position to an inner mandrel second position. The outer mandrel is moveable by the inner mandrel along the axis relative to the ring stripper from an outer mandrel first position to an outer mandrel second position.

15 Claims, 13 Drawing Sheets

(56) References Cited

U.S. PATENT DOCUMENTS

2010/0299906 A1* 12/2010 Oster .................. B23P 19/084
29/446
2014/0215798 A1 8/2014 Reece et al.

* cited by examiner

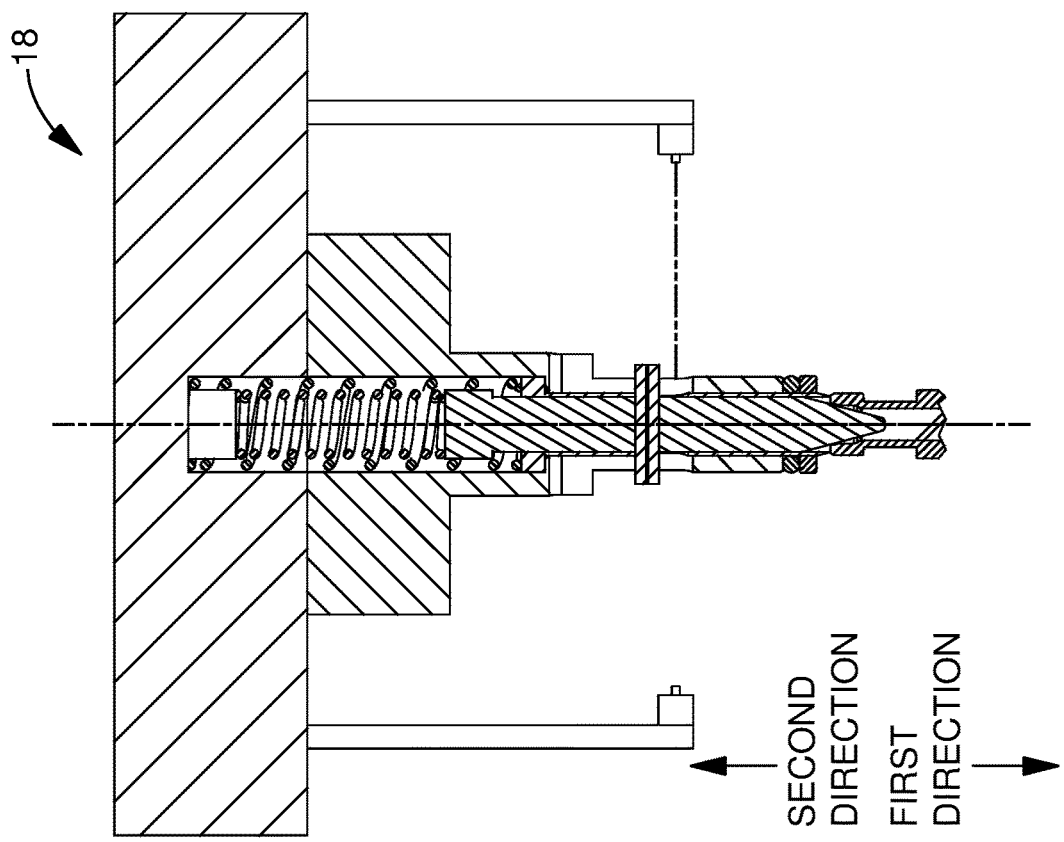
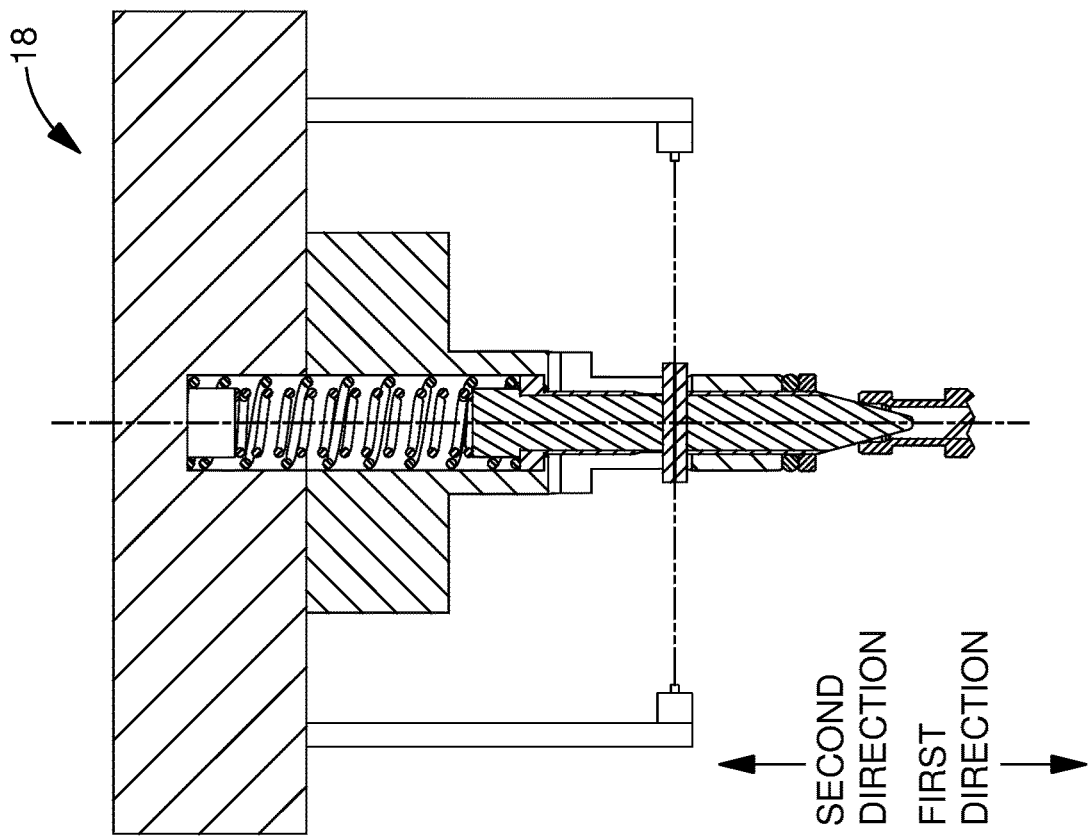

RING INSTALLATION DEVICE

TECHNICAL FIELD OF INVENTION

The present invention relates to a ring installation device for installing a ring to a part.

BACKGROUND OF INVENTION

O-rings are commonly used in many devices to provide fluid-tight sealing between two elements where it is typical to apply the O-ring to an external annular groove of one of the elements prior to assembling the other of the two elements. After the two elements are assembled to each other, the O-ring is compressed between the two elements, thereby providing a fluid-tight seal. In some situations, the O-ring is subject to high-pressure fluid in use, and consequently, a backup ring is used to support the O-ring, thereby preventing extrusion of the O-ring during operation and also thereby allowing the O-ring to maintain a fluid-tight seal. An example of one such arrangement is a fuel injector and fuel rail socket which is sealed by an O-ring which is supported by a backup ring as disclosed in U.S. Pat. No. 6,640,784 to Sims, Jr., the disclosure of which is incorporated herein by reference in its entirety.

In order to accommodate mass production, it is desirable to install such rings, i.e. O-rings and backup rings, with automated equipment. Some known automated equipment requires complex devices for expanding the rings for installation. U.S. Pat. No. 7,047,618 to Hunter discloses an O-ring insertion device which includes a piston housing and two concentric pistons. The concentric pistons are driven through an O-ring holder in order to pick an O-ring. After picking the O-ring, the O-ring holder expands outward, by urging of the piston housing and two pistons, to allow the piston housing and the two pistons to pass therethrough and approach the part which is to receive the O-ring. The inner-most piston is retracted into the outer piston and the outer piston encircles the part which is to receive the O-ring. Finally, the piston housing strips the ring from the outer piston, thereby placing the O-ring on the part. Such an arrangement leaves the tip of the outer piston susceptible to damage since the tip is very thin and could engage the part since there are no features which ensure alignment between the outer piston and the part which receives the O-ring. Damage to tip of the outer piston could lead to damage to O-rings that are assembled. Furthermore, the O-ring holder is complex by way of needing to expand to accommodate passage of the piston housing and the two pistons. It is also possible for the O-ring holder to damage or cause wear to the surfaces of the inner piston and the outer piston which expand the O-ring, thereby leading to damage of the O-rings. Another disadvantage of such an arrangement is the inability to install multiple rings simultaneously.

What is needed is a ring installation device which minimizes or eliminates one or more of the shortcomings as set forth above.

SUMMARY OF THE INVENTION

Briefly described, a ring installation device for installing a ring to a part includes an inner mandrel which is tapered in order to expand the ring, the inner mandrel being configured to engage the part; an outer mandrel which is tubular such that the inner mandrel is received within the outer mandrel and such that the inner mandrel is moveable within the outer mandrel along an axis, the outer mandrel being configured to receive the ring after being expanded by the inner mandrel; and a ring stripper which is tubular such that the outer mandrel is receive within the ring stripper and such that the outer mandrel is moveable within the inner mandrel along the axis, the ring stripper being configured to strip the ring off of the outer mandrel. The inner mandrel is moveable along the axis relative to the outer mandrel and the ring stripper from an inner mandrel first position to an inner mandrel second position when the inner mandrel engages the part and the outer mandrel and the ring stripper are moved toward the part along the axis and the outer mandrel is moveable by the inner mandrel along the axis relative to the ring stripper from an outer mandrel first position to an outer mandrel second position when the inner mandrel moves along the axis relative to the ring stripper from the inner mandrel second position to an inner mandrel third position. The ring installation device as described herein allows for simple and efficient installation of the ring to the part while minimizing the possibility of causing damage to the ring.

BRIEF DESCRIPTION OF DRAWINGS

This invention will be further described with reference to the accompanying drawings in which:

FIGS. 3A-3K show the ring handling member in a progression of steps involved in installing the first ring and the second ring to the fuel injector.

DETAILED DESCRIPTION OF INVENTION

Figure 1A:
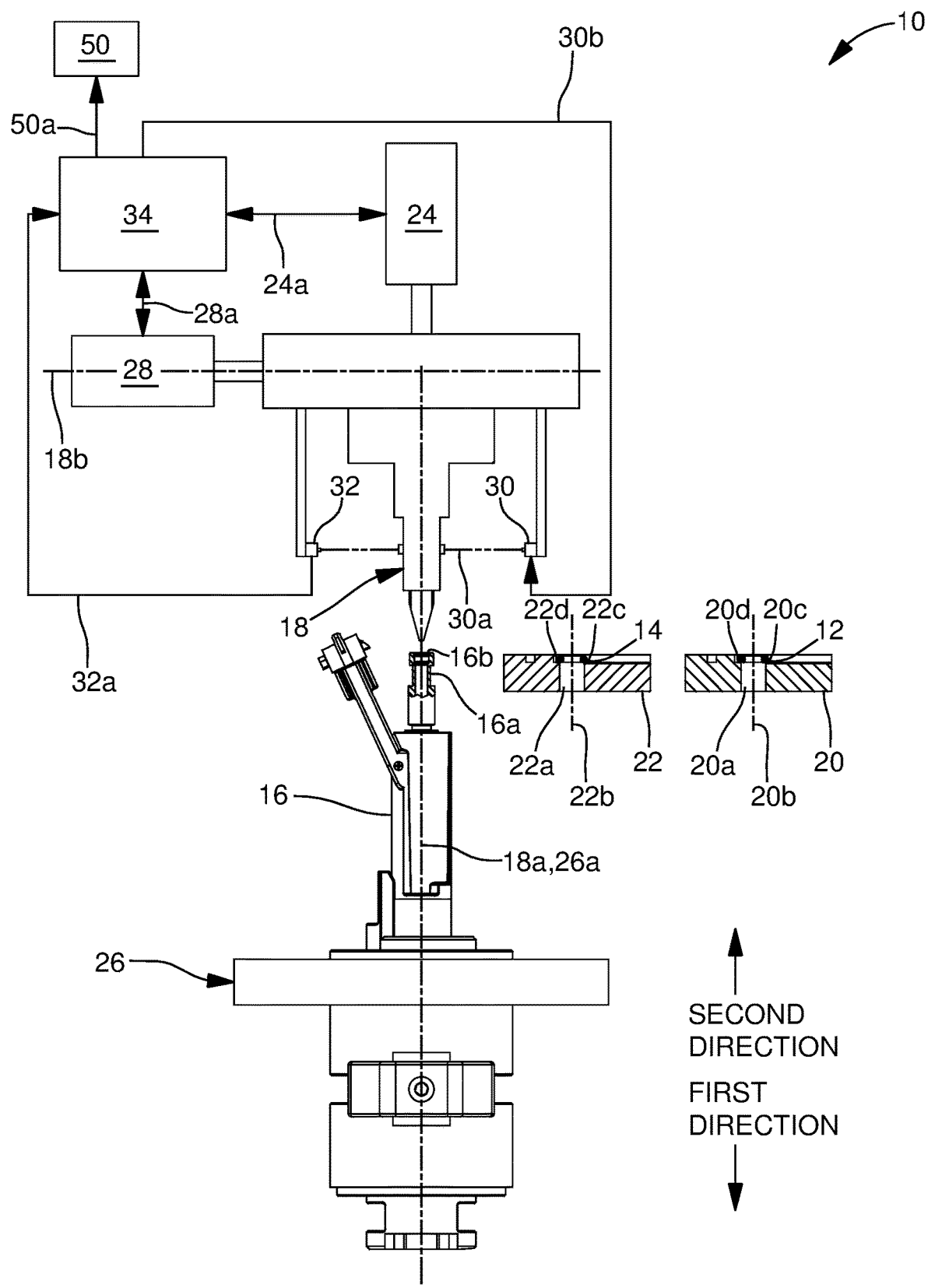
FIGS. 1A-1F are schematic views of a ring installation device in accordance with the present disclosure showing a progression of steps involved in installing a first ring and a second ring to a fuel injector.
Figure 4A:
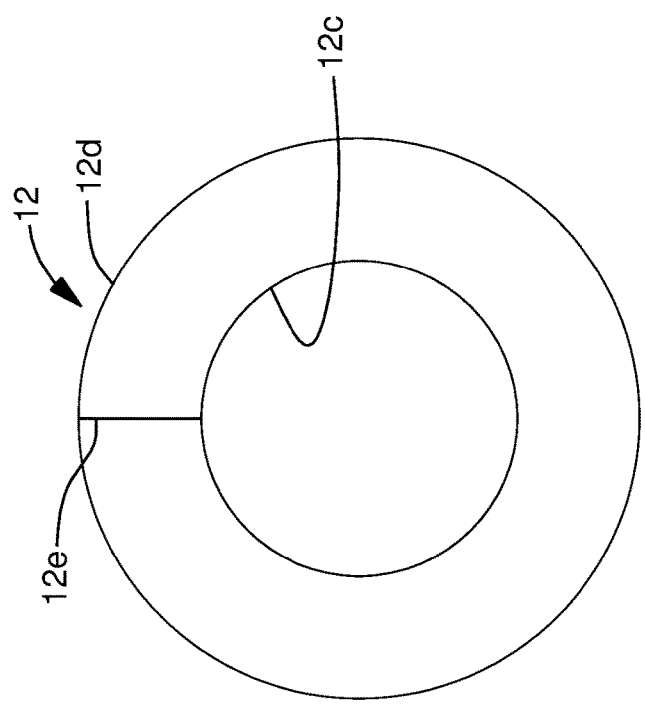
FIGS. 4A and 4B are a top view and a cross-sectional view respectively of the first ring.
Figure 4B:
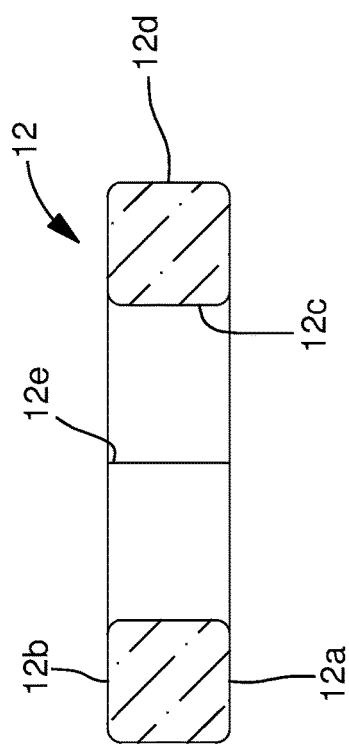

Referring initially to FIG. 1A, a ring installation device 10 for installing a ring to a part is illustrated in schematic form. For illustrative purposes, ring installation device 10 will be described herein as installing a first ring 12 and a second ring 14 to an inlet end of a fuel injector 16 where first ring 12 is a split ring which is made of relatively rigid material such as plastic or metal in order to provide axial support to second ring 14 which is made of an elastomer such as rubber, and consequently is more pliable than first ring 12. First ring 12 and second ring 14 are received within an annular groove 16a of fuel injector 16. In order for first ring 12 and second ring 14 to be installed within annular groove 16a, first ring 12 and second ring 14 must be elastically expanded outward to fit over the portion of fuel injector 16 which is adjacent to annular groove 16a, then first ring 12 and second ring 14 spring back inward when aligned with annular groove 16a. Since first ring 12 is made of a relatively rigid material, first ring 12 may be a split ring to accommodate the necessary outward expansion during installation. More specifically, as illustrated in FIGS. 4A and 4B, first ring 12 extends from a first face 12a to a second face 12b and also includes an inner periphery 12c and an outer periphery 12d. A discontinuity 12e extends from first face 12a to second face 12b and from inner periphery 12c to outer periphery 12d through one radial location of first ring 12. Consequently, first ring 12 is allowed to open up at discontinuity 12e to accommodate the elastic outward expansion during installation. In contrast, second ring 14 may be a conventional O-ring which is not split like first ring 12, but rather is a continuous ring. While first ring 12 and second ring 14 have been illustrated herein as being split and continuous respectively, it should be understood that both may be split or both may be continuous. Furthermore, while two rings have been illustrated herein, it should be understood that the present disclosure may be equally applicable to arrangements needing installation of a lesser number or a greater number of rings which could be any combination of split rings and continuous rings.

Ring installation device 10 generally includes a ring handling member 18 which picks first ring 12 and second ring 14 from a first ring holder 20 and a second ring holder 22 respectively and installs first ring 12 and second ring 14 on fuel injector 16; a first actuator 24 which moves ring handling member 18 along a ring handling member first axis 18a in order to pick first ring 12 from first ring holder 20 and second ring 14 from second ring holder 22 and in order to install first ring 12 and second ring 14 on fuel injector 16; a part holder 26 which holds fuel injector 16 during installation of first ring 12 and second ring 14; a second actuator 28 which moves ring handling member 18 along a ring handling member second axis 18b in order to translate ring handling member 18 in a lateral direction relative to ring handling member first axis 18a such that ring handling member second axis 18b is traverse to ring handling member first axis 18a and is preferably perpendicular to ring handling member first axis 18a; an emitter 30 which emits light, preferably a laser beam 30a, which is selectively received by a receiver 32 in order to monitor operation of ring handling member 18; and an electronic controller 34 in electric communication with first actuator 24, second actuator 28, emitter 30, and receiver 32 for operation thereof which will be described in greater detail later. In the paragraphs that follow, the elements of ring installation device 10 and operation thereof will be described in greater detail.

Figure 2:
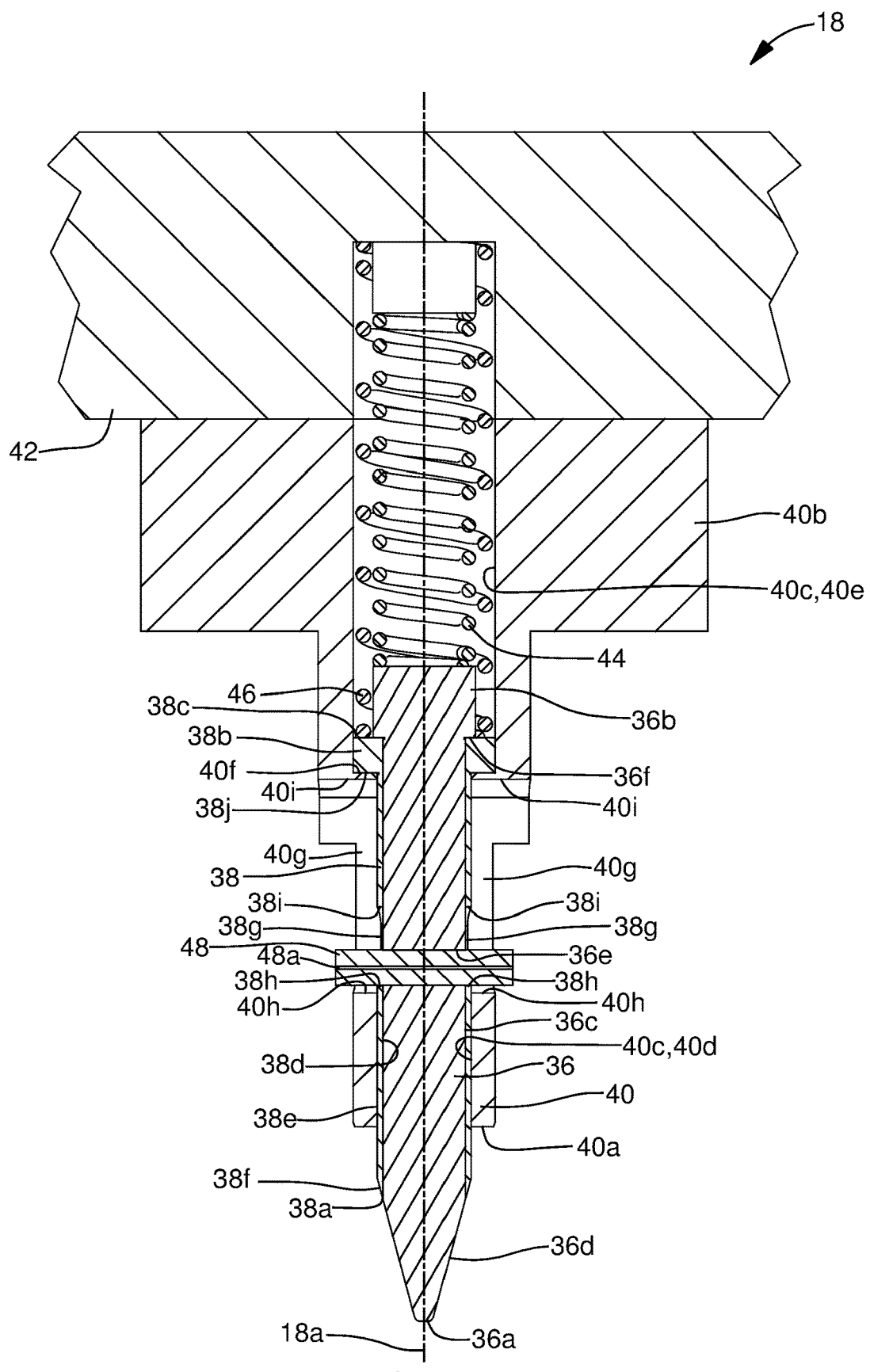
FIG. 2 is a cross-sectional view of a ring handling member of the ring installation device of FIGS. 1A-1F.

Ring handling member 18 will now be described in greater detail with respect to FIG. 2 where ring handling member 18 includes an inner mandrel 36; an outer mandrel 38; a ring stripper 40; a base 42 to which ring stripper 40 is fixed; an inner mandrel return spring 44 which biases inner mandrel 36 in a first direction, illustrated as down in the figures, along ring handling member first axis 18a; and an outer mandrel return spring 46 which biases outer mandrel 38 in the first direction. Inner mandrel 36, outer mandrel 38, and ring stripper 40 are each moveable along ring handling member first axis 18a relative to each other as will be described later.

Inner mandrel 36 extends along ring handling member first axis 18a from an inner mandrel tip 36a to an inner mandrel head 36b. An inner mandrel central portion 36c is located axially between inner mandrel tip 36a and inner mandrel head 36b such that inner mandrel central portion 36c is centered about ring handling member first axis 18a and is preferably cylindrical. An inner mandrel tapered portion 36d is located axially between inner mandrel tip 36a and inner mandrel central portion 36c such that inner mandrel tapered portion 36d is tapered to decrease in cross-sectional area in a direction from inner mandrel central portion 36c toward inner mandrel tip 36a. As illustrated in the figures, inner mandrel tapered portion 36d is preferably tapered at a uniform rate and consequently is frustoconical or conical and centered about ring handling member first axis 18a. Also as illustrated in the figures, inner mandrel tip 36a is preferably radiused in order to prevent a sharp point from being formed at inner mandrel tip 36a. The tapered nature of inner mandrel tapered portion 36d allows for easy insertion thereof into first ring 12 and second ring 14 and expand first ring 12 and second ring 14 as inner mandrel tapered portion 36d is inserted further into first ring 12 and second ring 14.

Inner mandrel central portion 36c includes an inner mandrel bore 36e which extends therethrough traverse to ring handling member first axis 18a and preferably in a direction perpendicular to ring handling member first axis 18a. An actuation member 48 is located within inner mandrel bore 36e and fixed therein, for example, by one or more of interference fit, welding, adhesives, mechanical fasteners, and the like. Actuation member 48 extends outward from inner mandrel bore 36e in order to move outer mandrel 38 relative to ring stripper 40 as will be described in greater detail later. Actuation member 48 is tubular and includes an actuation member bore 48a extending therethrough in the same direction that actuation member 48 extends through inner mandrel 36 and is preferably perpendicular to ring handling member first axis 18a. Actuation member bore 48a provides a path for laser beam 30a emitted by emitter 30 to pass under certain conditions which is used to monitor operation of ring installation device 10 as will be described in greater detail later.

Inner mandrel head 36b is larger in diameter than inner mandrel central portion 36c, thereby defining an inner mandrel shoulder 36f which faces in a direction toward outer mandrel 38. Inner mandrel shoulder 36f is annular in shape and may be perpendicular to ring handling member first axis 18a as illustrated in the figures. Inner mandrel shoulder 36f is used to limit travel of inner mandrel 36 relative to outer mandrel 38 along ring handling member first axis 18a in the first direction as will be described in greater detail later.

Outer mandrel 38 is tubular and extends along ring handling member first axis 18a from an outer mandrel tip 38a to an outer mandrel head 38b which terminates at an outer mandrel end face 38c. An outer mandrel bore 38d extends along ring handling member first axis 18a from outer mandrel tip 38a to outer mandrel end face 38c such that inner mandrel 36 is received within outer mandrel bore 38d. An outer mandrel central portion 38e is located axially between outer mandrel tip 38a and outer mandrel head 38b such that outer mandrel central portion 38e is centered about ring handling member first axis 18a and is preferably cylindrical. Inner mandrel central portion 36c and outer mandrel bore 38d are sized to allow inner mandrel 36 and outer mandrel 38 to move relative to each other along ring handling member first axis 18a but substantially prevent relative movement between inner mandrel 36 and outer mandrel 38 in a direction perpendicular to ring handling member first axis 18a. Furthermore, the outer diameter of outer mandrel central portion 38e is sized to closely match the outside diameter of the portion of fuel injector 16 which initially receives first ring 12 and second ring 14. This close match in diameters allows for a smooth transfer of first ring 12 and second ring 14 from outer mandrel 38 to fuel injector 16. An outer mandrel tapered portion 38f extends from outer mandrel central portion 38e to outer mandrel tip 38a such that outer mandrel tapered portion 38f is tapered to decrease in cross-sectional area in a direction from outer mandrel central portion 38e toward outer mandrel tip 38a. As illustrated in the figures, outer mandrel tapered portion 38f is preferably tapered at a uniform rate and consequently is frustoconical and centered about ring handling member first axis 18a. Also as illustrated in the figures, outer mandrel tapered portion 38f is tapered to match the taper of inner mandrel tapered portion 36d. The tapered nature of outer mandrel tapered portion 38f allows for first ring 12 and second ring 14 to easily transition from inner mandrel tapered portion 36d to outer mandrel tapered portion 38f and to further expand first ring 12 and second ring 14 as outer mandrel tapered portion 38f is inserted further into first ring 12 and second ring 14 and ultimately allow first ring 12 and second ring 14 to be placed on outer mandrel central portion 38e.

Outer mandrel central portion 38e includes outer mandrel slots 38g which each extend radially therethrough from outer mandrel bore 38d to an outer periphery of outer mandrel central portion 38e such that outer mandrel slots 38g are diametrically opposed to each other and such that actuation member 48 extends into outer mandrel slots 38g. Outer mandrel slots 38g each have a width in a direction normal to ring handling member first axis 18a which allows actuation member 48 to slide within outer mandrel slots 38g in a direction parallel to ring handling member first axis 18a. Each outer mandrel slot 38g extends in a direction parallel to ring handling member first axis 18a from an outer mandrel slot first end 38h, which is proximal to outer mandrel tip 38a, to an outer mandrel slot second end 38i, which is distal from outer mandrel tip 38a.

Outer mandrel head 38b is larger in diameter than outer mandrel central portion 38e, thereby defining an outer mandrel shoulder 38j which faces in a direction toward ring stripper 40. Outer mandrel shoulder 38j is annular in shape and may be perpendicular to ring handling member first axis 18a as illustrated in the figures. Outer mandrel shoulder 38j is used to limit travel of outer mandrel 38 relative to ring stripper 40 along ring handling member first axis 18a in the first direction as will be described in greater detail later.

Ring stripper 40 is tubular and extends along ring handling member first axis 18a from a ring stripper end face 40a to a ring stripper head 40b. Ring stripper end face 40a circumferentially surrounds inner mandrel 36 and is traverse to ring handling member first axis 18a and preferably is perpendicular to ring handling member first axis 18a. A ring stripper bore 40c extends along ring handling member first axis 18a from ring stripper end face 40a to ring stripper head 40b. Ring stripper bore 40c is stepped, thereby defining a ring stripper bore first portion 40d which is proximal to ring stripper end face 40a and a ring stripper bore second portion 40e which is distal from ring stripper end face 40a. Ring stripper bore first portion 40d and ring stripper bore second portion 40e are each preferably cylindrical such that ring stripper bore first portion 40d is smaller in diameter than ring stripper bore second portion 40e, thereby defining a ring stripper shoulder 40f. Ring stripper shoulder 40f is traverse to ring handling member first axis 18a and is preferably perpendicular to ring handling member first axis 18a. Outer mandrel 38 is receive within ring stripper bore 40c such that outer mandrel head 38b is located only within ring stripper bore second portion 40e and outer mandrel central portion 38e is located within ring stripper bore first portion 40d. Outer mandrel central portion 38e and ring stripper bore first portion 40d are sized to allow outer mandrel 38 and ring stripper 40 to move relative to each other along ring handling member first axis 18a but substantially prevent relative movement between outer mandrel 38 and ring stripper 40 in a direction perpendicular to ring handling member first axis 18a.

Ring stripper 40 includes ring stripper slots 40g which each extend radially therethrough from ring stripper bore first portion 40d to an outer periphery of ring stripper 40 such that ring stripper slots 40g are diametrically opposed to each other and such that actuation member bore 48a is aligned with stripper ring slots where actuation member 48 preferably extends into ring stripper slots 40g as shown in the figures. Ring stripper slots 40g each have a width in a direction normal to ring handling member first axis 18a which allows actuation member 48 to slide within ring stripper slots 40g in a direction parallel to ring handling member first axis 18a. Each ring stripper slot 40g extends in a direction parallel to ring handling member first axis 18a from ring stripper slot first end 40h, which is proximal to ring stripper end face 40a, to ring stripper slot second end 40i, which is distal from ring stripper end face 40a.

As illustrated in the figures, inner mandrel return spring 44 is located at least partially within ring stripper bore 40c and outer mandrel return spring 46 is located at least partially within ring stripper bore 40c. Ring stripper 40 is fixed to base 42 at ring stripper head 40b such that one end of inner mandrel return spring 44 and one end of outer mandrel return spring 46 are each grounded to base 42. Alternatively, one or more of inner mandrel return spring 44 and outer mandrel return spring 46 may be grounded directly to ring stripper 40 or any other element that remains in fixed relationship to ring stripper 40. The other end of inner mandrel return spring 44 abuts inner mandrel head 36b such that inner mandrel return spring 44 is held in compression between inner mandrel head 36b and base 42. Consequently, when no external forces are applied to inner mandrel 36, inner mandrel return spring 44 urges inner mandrel shoulder 36f into axial engagement with outer mandrel end face 38c which limits travel of inner mandrel 36 relative to outer mandrel 38 in the first direction along ring handling member first axis 18a. Similarly, the other end of outer mandrel return spring 46 abuts outer mandrel end face 38c such that outer mandrel return spring 46 is held in compression between outer mandrel end face 38c and base 42. Consequently, when no external forces are applied to inner mandrel 36 or outer mandrel 38, outer mandrel return spring 46 urges outer mandrel shoulder 38j into axial engagement with ring stripper shoulder 40f. As shown in the figures, outer mandrel return spring 46 circumferentially surrounds inner mandrel head 36b.

Figure 3A:
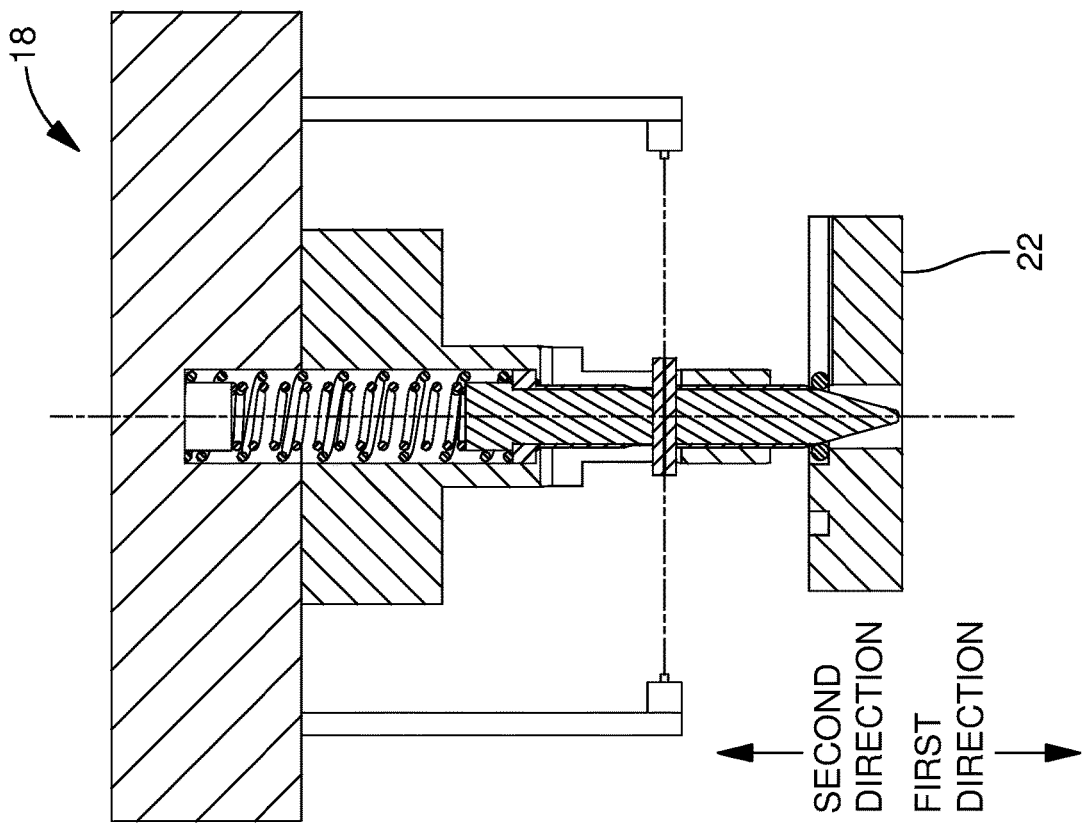
Figure 3B:
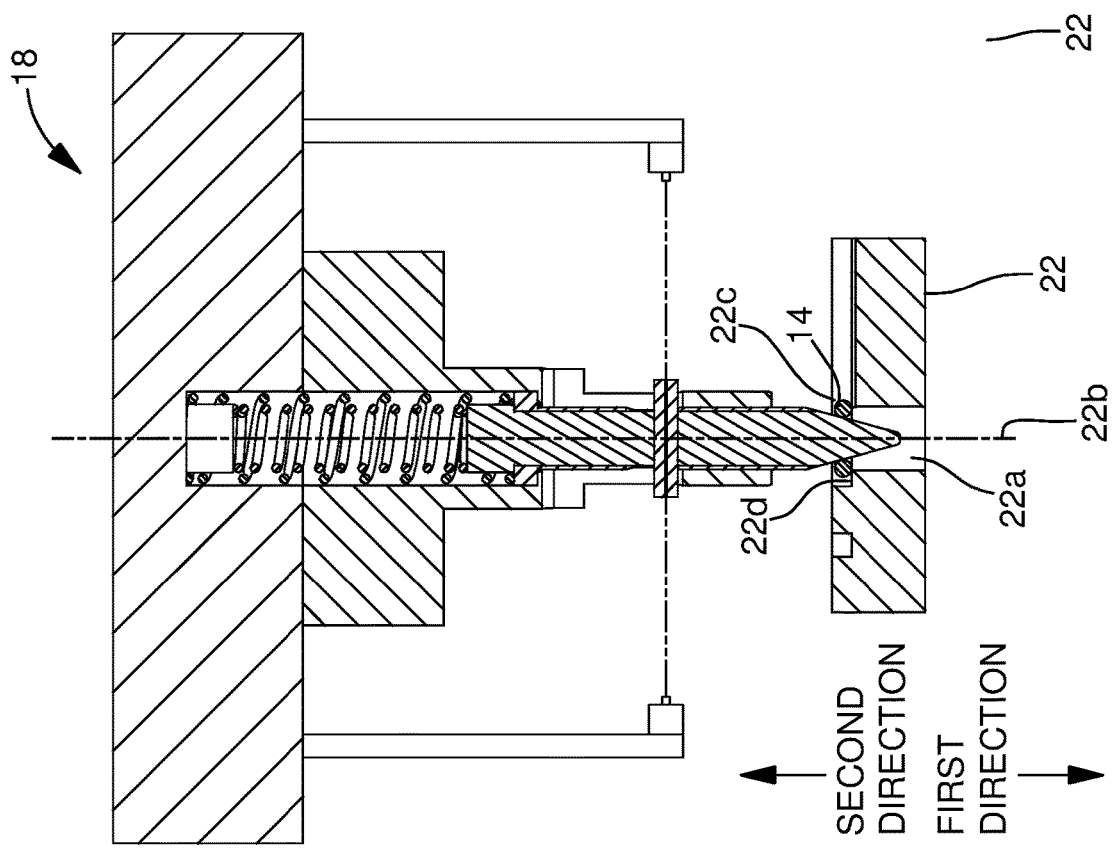
Figure 3D:
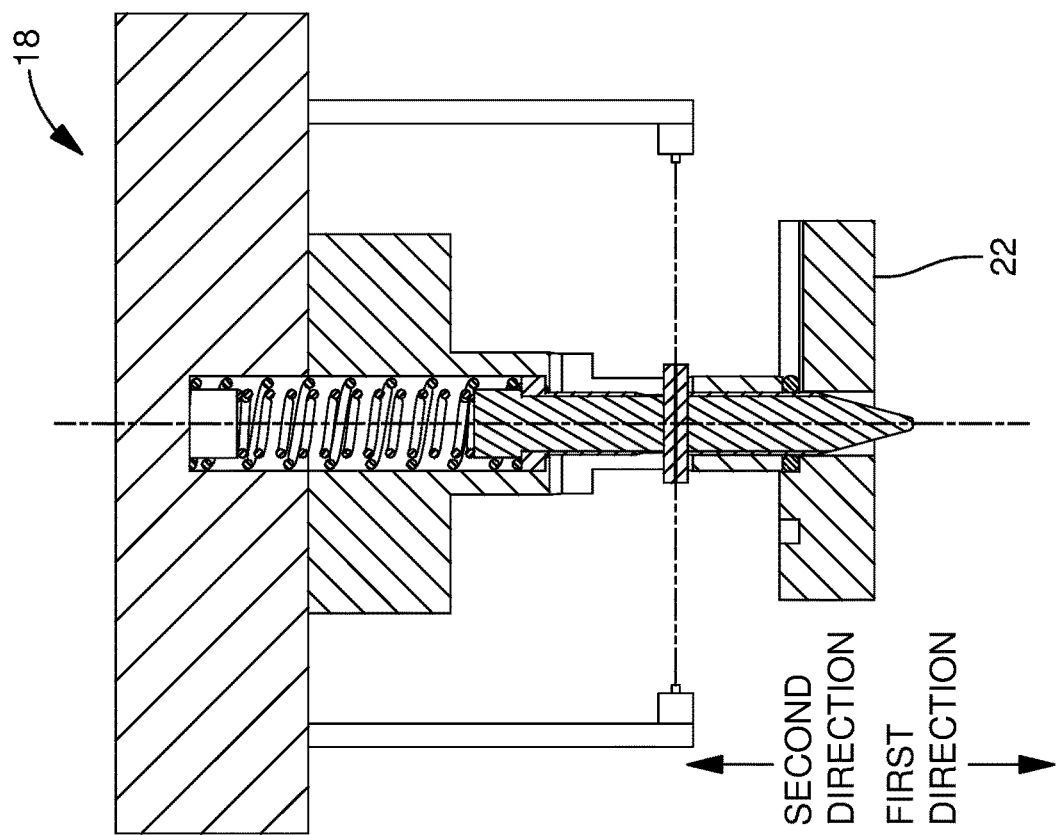
Figure 3C:
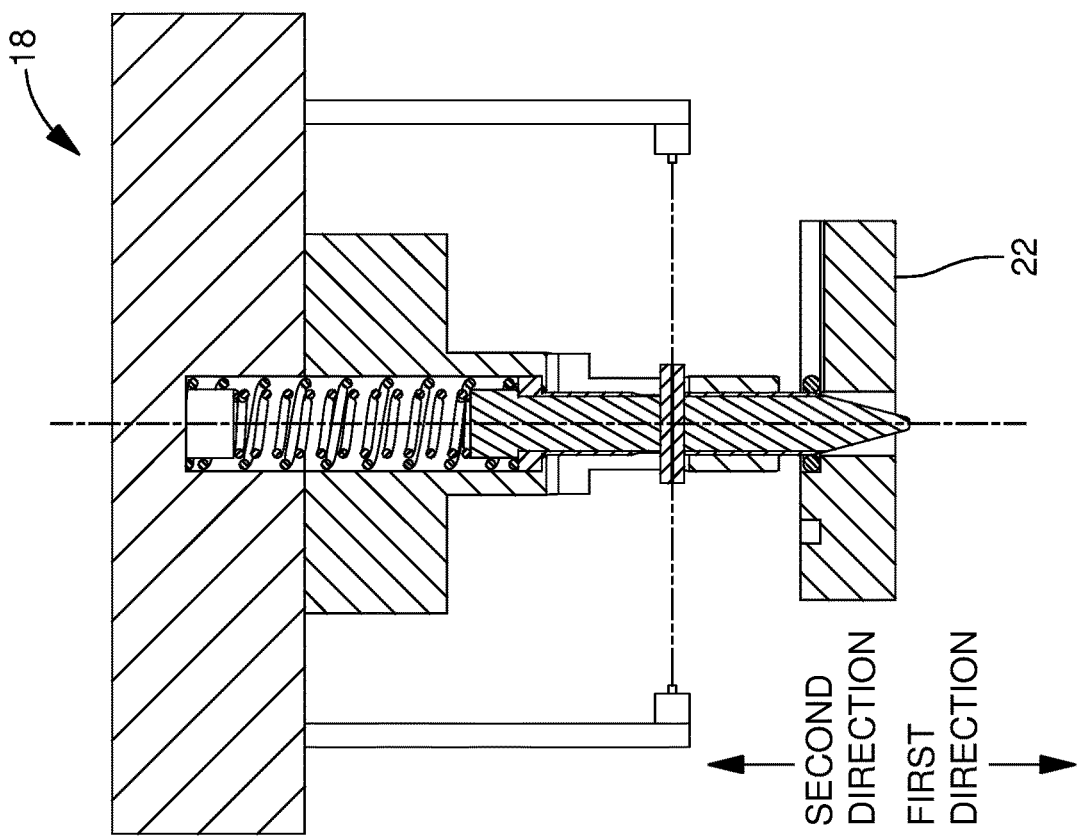
Figure 3F:
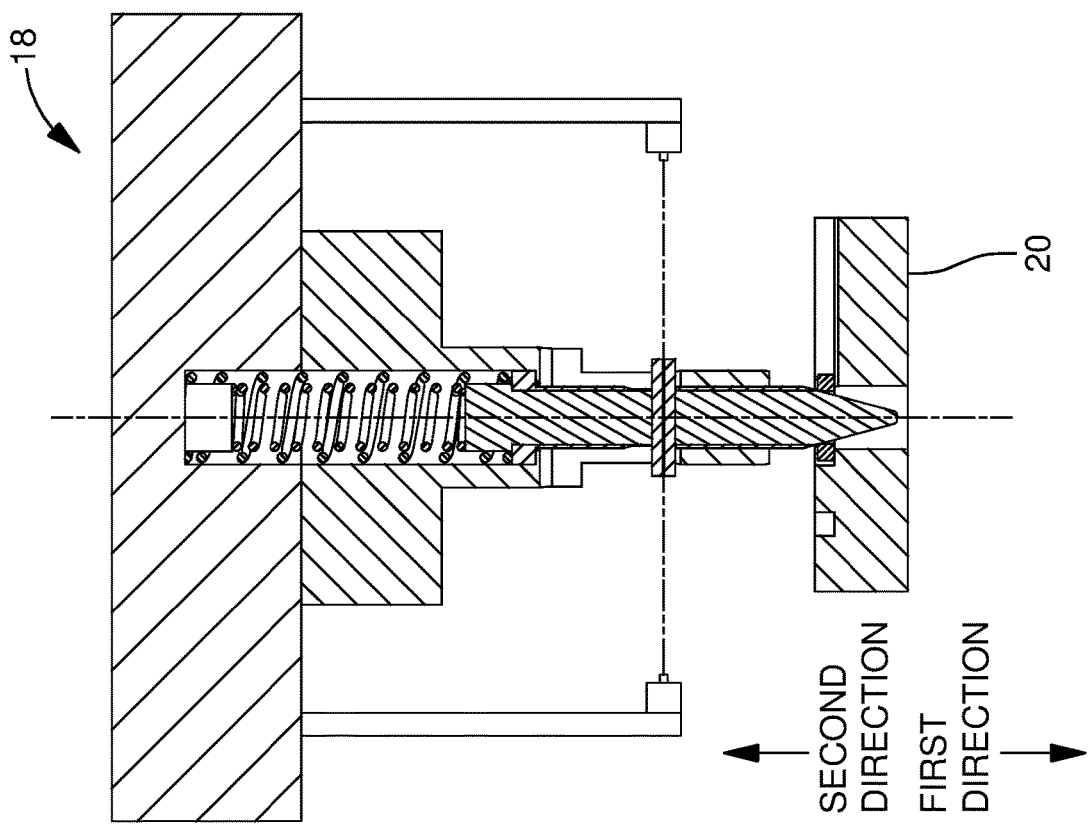
Figure 3E:
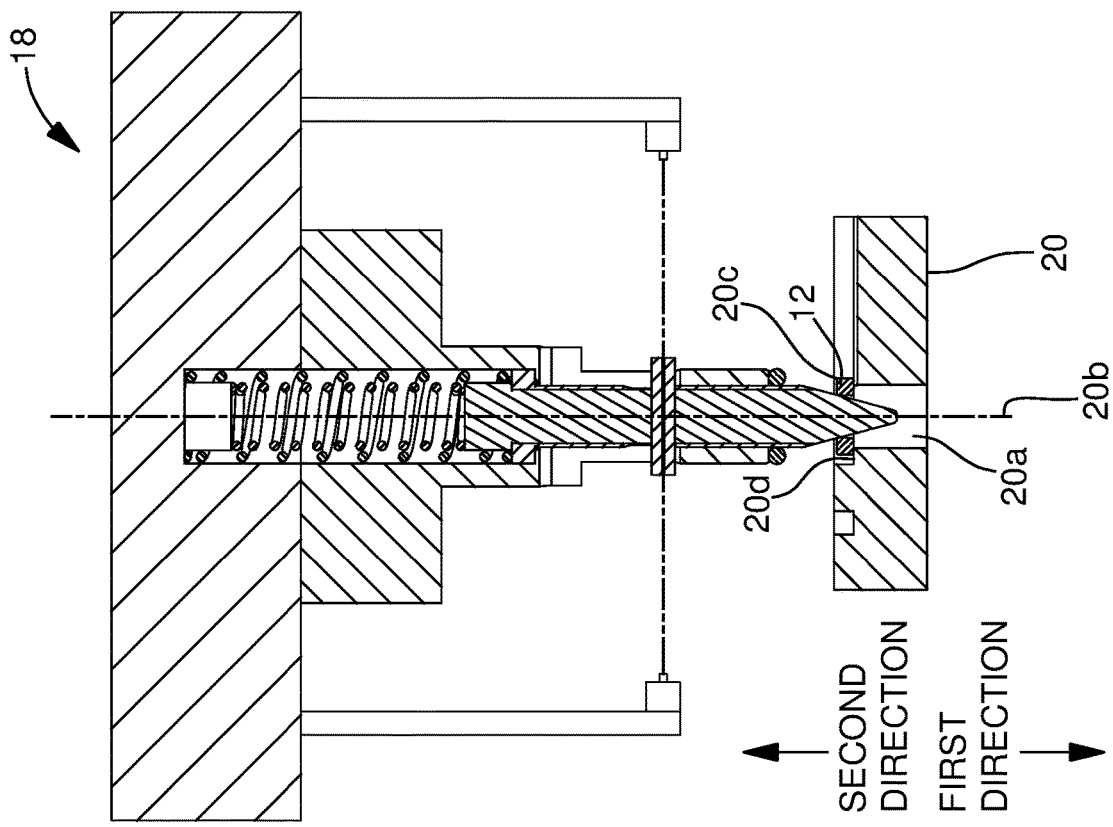
Figure 3H:
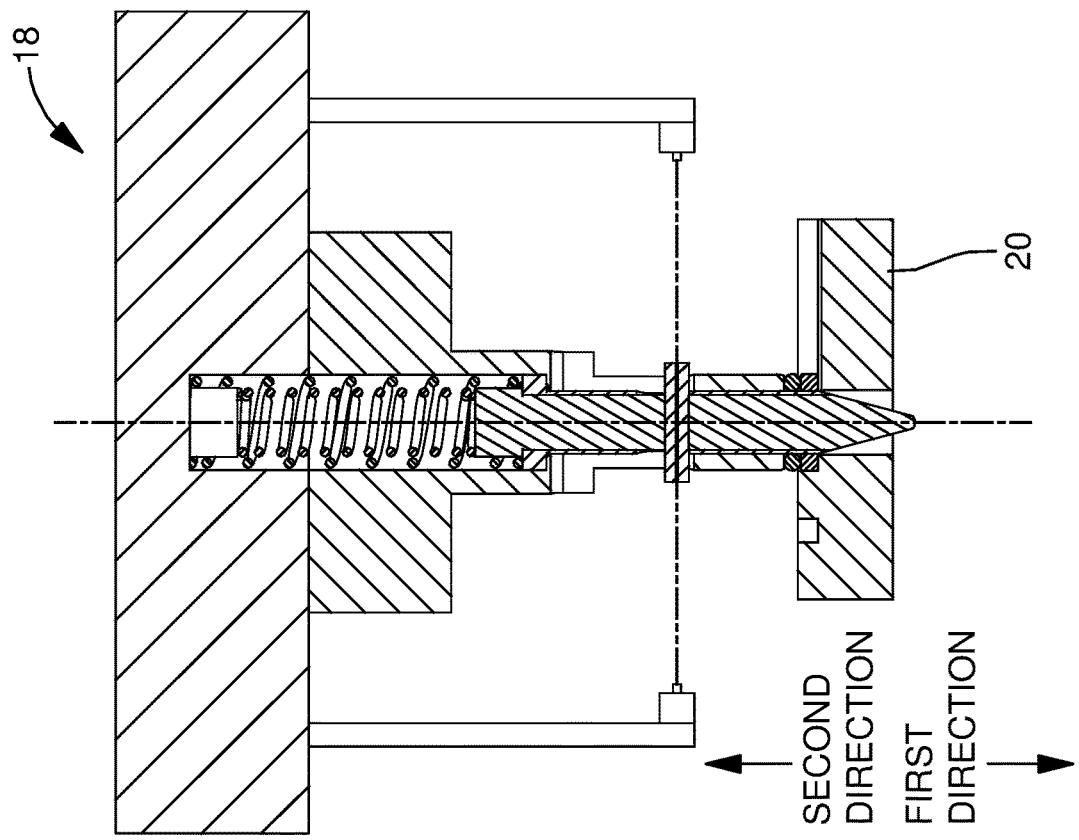
Figure 3G:
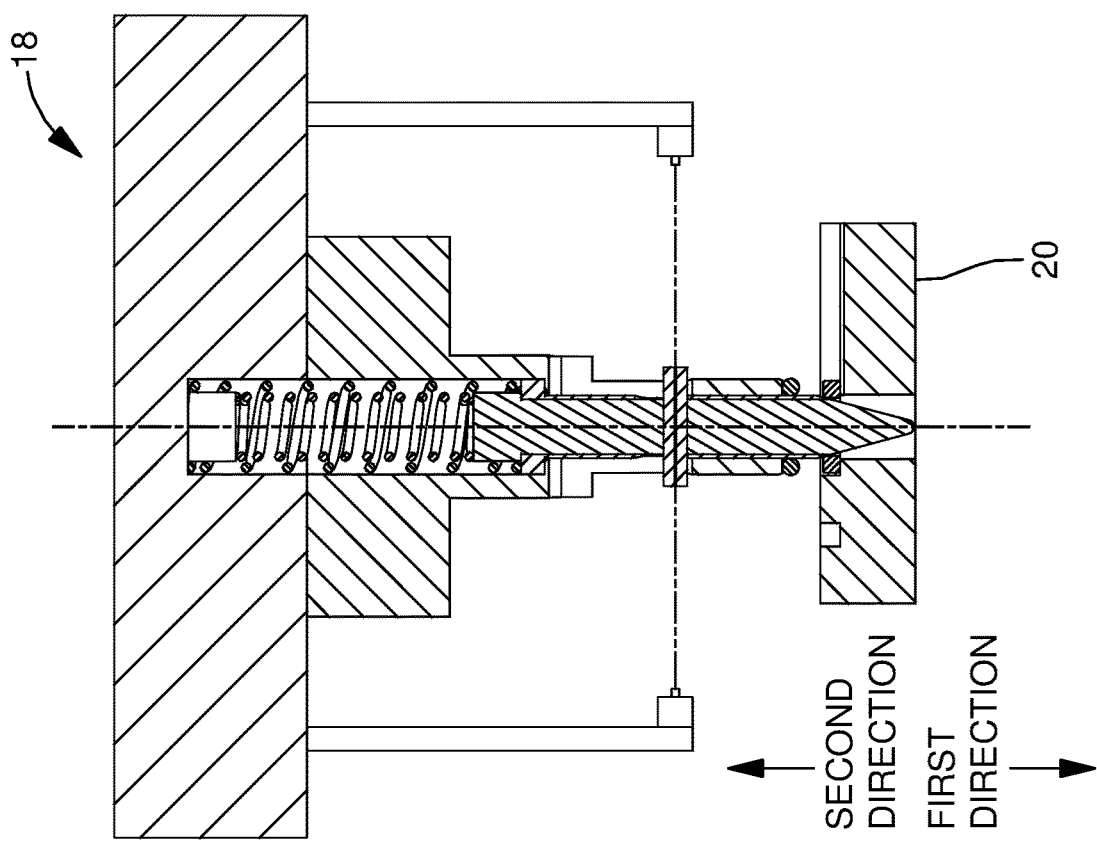

Referring again to FIG. 1A and also referring to FIG. 3E, first ring holder 20 includes a first ring holder bore 20a which is sized to allow inner mandrel 36 and outer mandrel 38 to be freely received therein and which is also sized to prevent first ring 12 from passing therethrough. First ring holder bore 20a is preferably cylindrical and is centered about, and extends along, a first ring holder axis 20b which is parallel to ring handling member first axis 18a. First ring holder 20 also includes a first ring holder recess 20c at the end of first ring holder bore 20a such that first ring holder recess 20c extends radially outward from first ring holder axis 20b sufficiently far to accommodate outward expansion of first ring 12 when picked by ring handling member 18. A first ring holder shoulder 20d joins first ring holder bore 20a and first ring holder recess 20c such that first ring holder shoulder 20d is traverse to first ring holder axis 20b and is preferably perpendicular to first ring holder axis 20b. First ring 12 is placed in first ring holder recess 20c such that first ring 12 rests upon first ring holder shoulder 20d to await picking by ring handling member 18. First ring 12 may be placed in first ring holder recess 20c, by way of non-limiting example, conveyer, vibratory track, or human operator which will not be described further herein.

With continued reference to FIG. 1A and now also referring to FIG. 3A second ring holder 22 includes a second ring holder bore 22a which is sized to allow inner mandrel 36 and outer mandrel 38 to be freely received therein and which is also sized to prevent second ring 14 from passing therethrough. Second ring holder bore 22a is preferably cylindrical and is centered about, and extends along, a second ring holder axis 22b which is parallel to ring handling member first axis 18a and which is laterally offset from first ring holder axis 20b. Second ring holder 22 also includes a second ring holder recess 22c at the end of second ring holder bore 22a such that second ring holder recess 22c extends radially outward from second ring holder axis 22b sufficiently far to accommodate outward expansion of second ring 14 when picked by ring handling member 18. A second ring holder shoulder 22d joins second ring holder bore 22a and second ring holder recess 22c such that second ring holder shoulder 22d is traverse to second ring holder axis 22b and is preferably perpendicular to second ring holder axis 22b. Second ring 14 is placed in second ring holder recess 22c such that second ring 14 rests upon second ring holder shoulder 22d to await picking by ring handling member 18. Second ring 14 may be placed in second ring holder recess 22c, by way of non-limiting example, conveyer, vibratory track, or human operator which will not be described further herein.

With continued reference to FIG. 1A, first actuator 24 may be any type of actuator that is capable of translating ring handling member 18 along ring handling member first axis 18a, and may be, by way of non-limiting example only, an electric servo, pneumatic actuator, or hydraulic actuator and may be part of, by way of non-limiting example only, a 6-axis robot or SCARA robot. First actuator 24 is in electric communication with electronic controller 34 in order to send first actuator signals 24a between first actuator 24 and electronic controller 34. First actuator signals 24a include instructions from electronic controller 34 which cause first actuator 24 to displace ring handling member 18 to desired positions during the process of picking first ring 12 and second ring 14 and installing first ring 12 and second ring 14. First actuator signals 24a may also include position feedback from first actuator 24 to electronic controller 34 to ensure that ring handling member 18 is positioned as desired.

Second actuator 28 may be any type of actuator that is capable of translating ring handling member 18 along ring handling member second axis 18b, and may be, by way of non-limiting example only, an electric servo, pneumatic actuator, or hydraulic actuator and may be part of, by way of non-limiting example only, a 6-axis robot or SCARA robot. Second actuator 28 is in electric communication with electronic controller 34 in order to send second actuator signals 28a between second actuator 28 and electronic controller 34. Second actuator signals 28a include instructions from electronic controller 34 which cause second actuator 28 to displace ring handling member 18 to desired positions during the process of picking first ring 12 and second ring 14 and installing first ring 12 and second ring 14. Second actuator signals 28a may also include position feedback from second actuator 28 to electronic controller 34 to ensure that ring handling member 18 is positioned as desired.

First actuator 24 and second actuator 28 collectively provide an actuation arrangement. While first actuator 24 and second actuator 28 have each been illustrated herein as each translating along distinct linear axis of ring handling member first axis 18a and ring handling member second axis 18b respectively, it should be understood, for example in the case of the actuation arrangement being part of a 6-axis robot, first actuator 24 and second actuator 28 may work collectively along with other actuators to provide the desired translations of ring handling member 18. Furthermore, while ring handling member first axis 18a must be linear, ring handling member second axis 18b may be non-linear.

Part holder 26 may be any fixture that supports fuel injector 16 so as to orient and hold fuel injector 16 to receive first ring 12 and second ring 14 from ring handling member 18. Part holder 26 holds fuel injector 16 so as to center annular groove 16a about a part holder axis 26a which is parallel to ring handling member first axis 18a and which is laterally offset from first ring holder axis 20b and second ring holder axis 22b.

Emitter 30 and receiver 32 are each fixed to base 42 such that emitter 30 and receiver 32 each remain stationary to ring stripper 40 throughout operation of ring installation device 10. Emitter 30 and receiver 32 are each in electrical communication with electronic controller 34 such that emitter 30 receives an emitter signal 30b from electronic controller to cause laser beam 30a to be emitted therefrom and such that receiver 32 sends a receiver signal 32a to electronic controller 34 when receiver 32 receives laser beam 30a. As illustrated in FIGS. 1A, 2, and 3A, ring handling member 18 is shown in a free state where no external forces are applied thereto or are sufficiently small which prohibits inner mandrel 36 and outer mandrel 38 from being retracted into ring stripper 40. In the free state, inner mandrel 36 is fully extended by inner mandrel return spring 44 relative to outer mandrel 38 and ring stripper 40 such that inner mandrel 36 is in an inner mandrel first position. When inner mandrel 36 is in the inner mandrel first position, actuation member bore 48a is aligned with emitter 30 and receiver 32 to allow laser beam 30a to be received by receiver 32, i.e. laser beam 30a passes through actuation member bore 48a. Also in the free state, outer mandrel 38 is fully extended by outer mandrel return spring 46 relative to ring stripper 40 such that outer mandrel 38 is in an outer mandrel first position.

Electronic controller 34 may include a processor (not shown) such as a microprocessor or other control circuitry such as analog and/or digital control circuitry including an application specific integrated circuit (ASIC) for processing data as is known to those or ordinary skill in the art. Electronic controller 34 may also include memory (not shown) including non-volatile memory, such as electrically erasable programmable read-only memory (EEPROM) for storing one or more routines, thresholds, and captured data. The one or more routines may be executed by the processor to perform steps to cause ring handling member 18 to pick first ring 12 and second ring 14 and to install first ring 12 and second ring 14 on fuel injector 16.

Figure 1B:
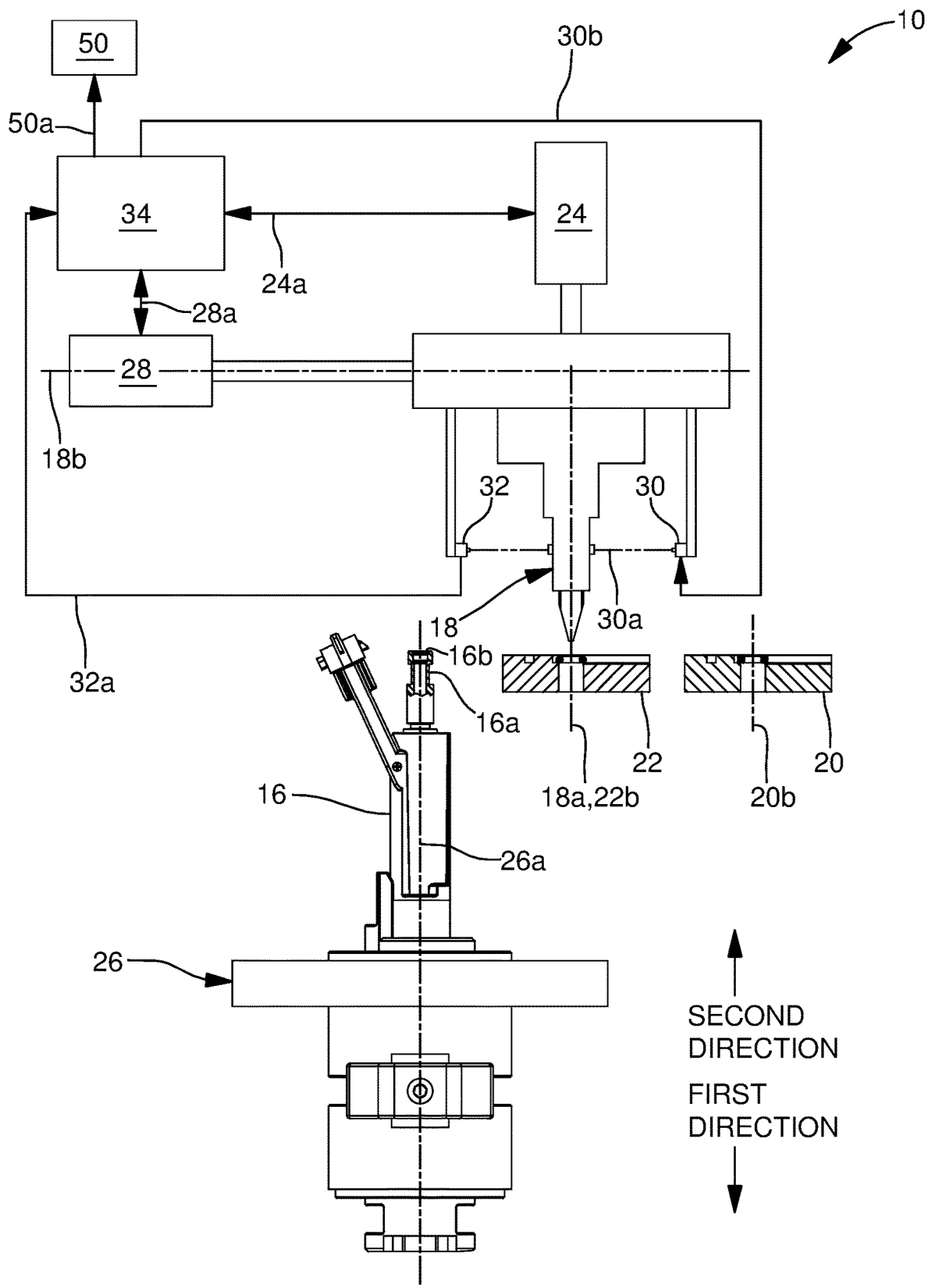
Figure 1C:
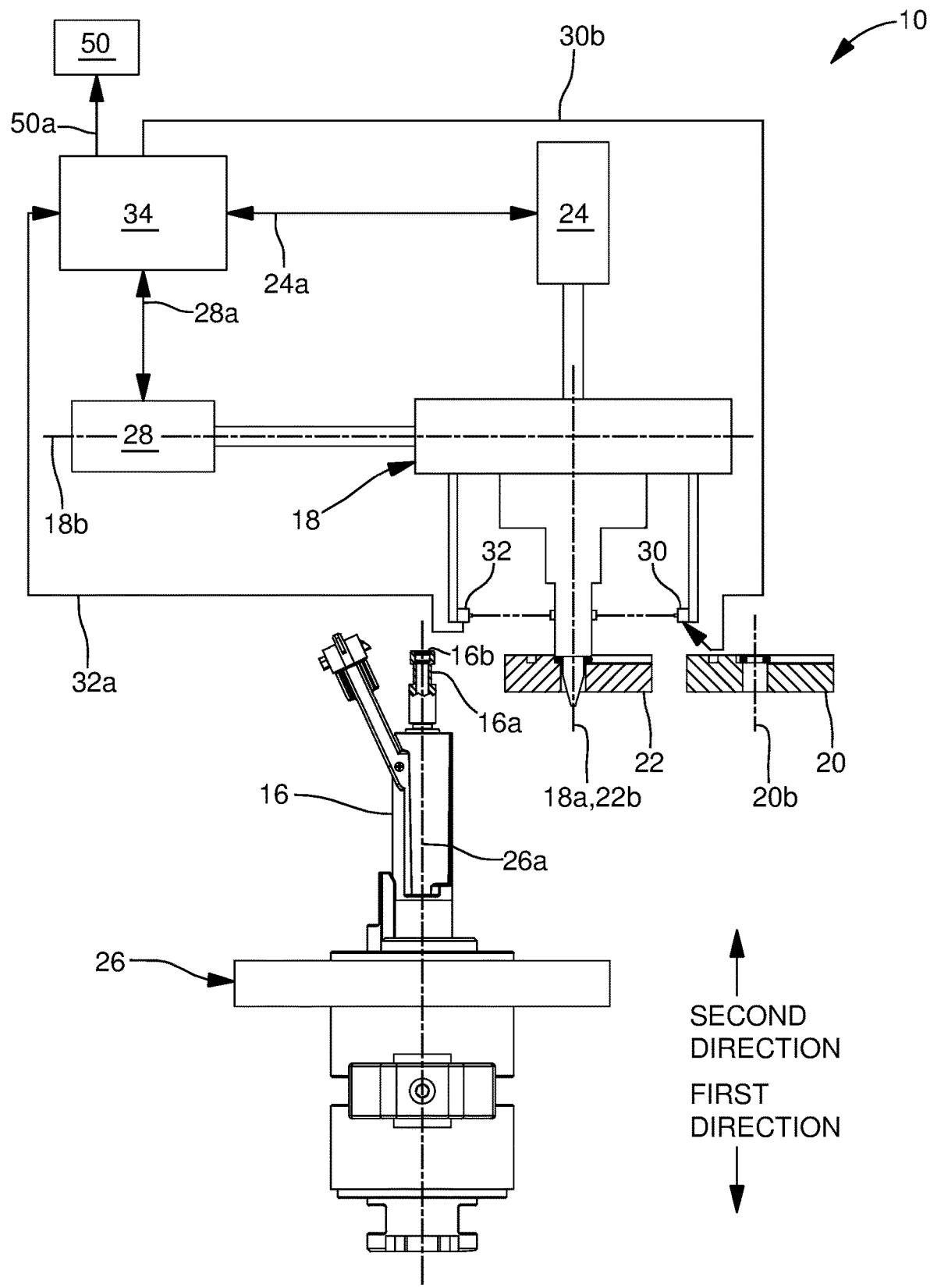

To initiate installation of first ring 12 and second ring 14, electronic controller 34 instructs second actuator 28 to translate ring handling member 18 along ring handling member second axis 18b until ring handling member first axis 18a is aligned with second ring holder axis 22b, within an allowable tolerance, as illustrated in FIG. 1B. Next, electronic controller 34 instructs first actuator 24 to translate ring handling member 18 along ring handling member first axis 18a in the first direction as illustrated in FIGS. 1C and 3A-3D which causes inner mandrel tapered portion 36d to expand second ring 14 outward, and as ring handling member 18 continues to advance in the first direction, second ring 14 is transferred to outer mandrel tapered portion 38f where second ring 14 is further expanded outward and subsequently transferred to outer mandrel central portion 38e.

Figure 1D:
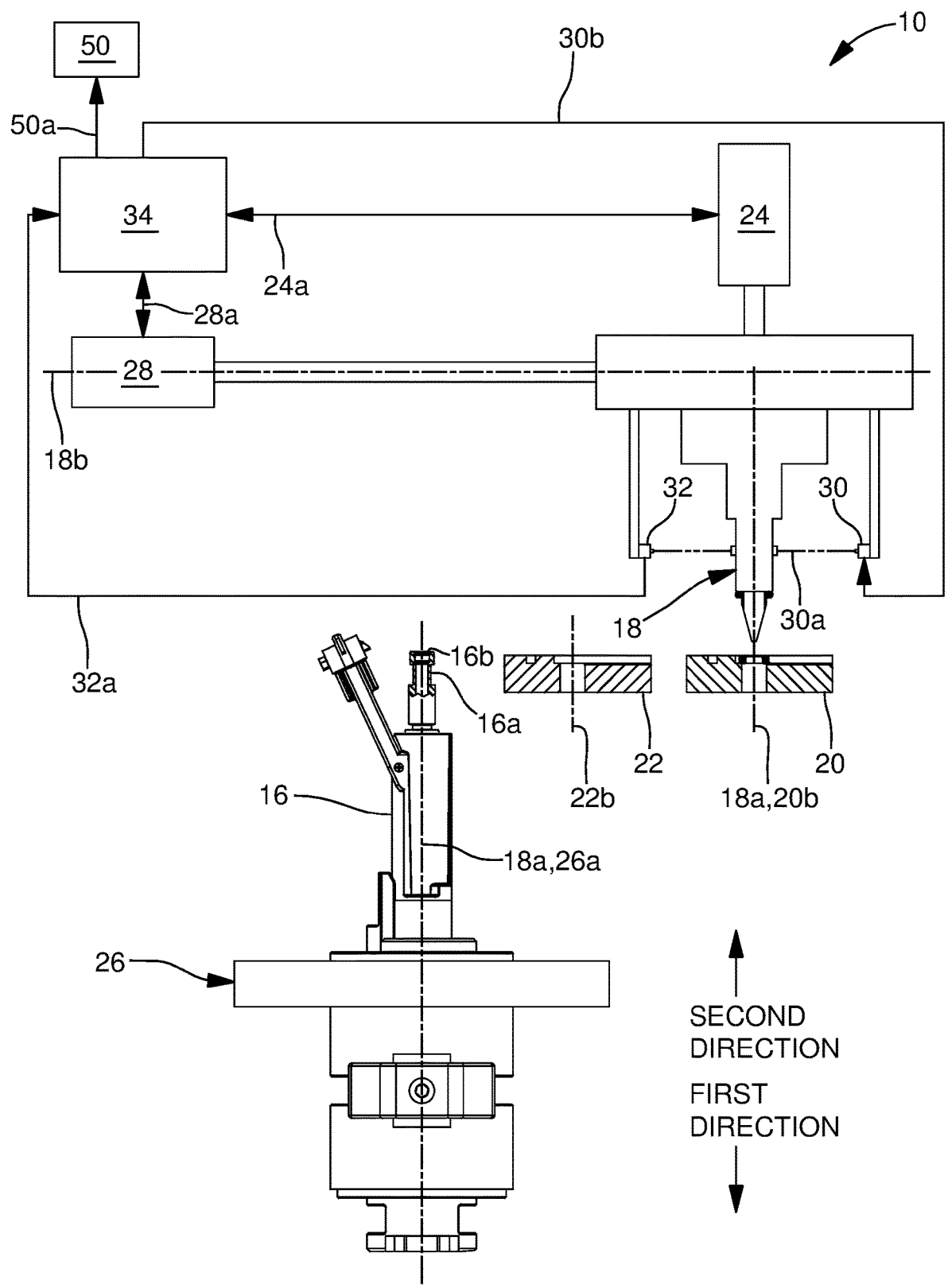
Figure 1E:
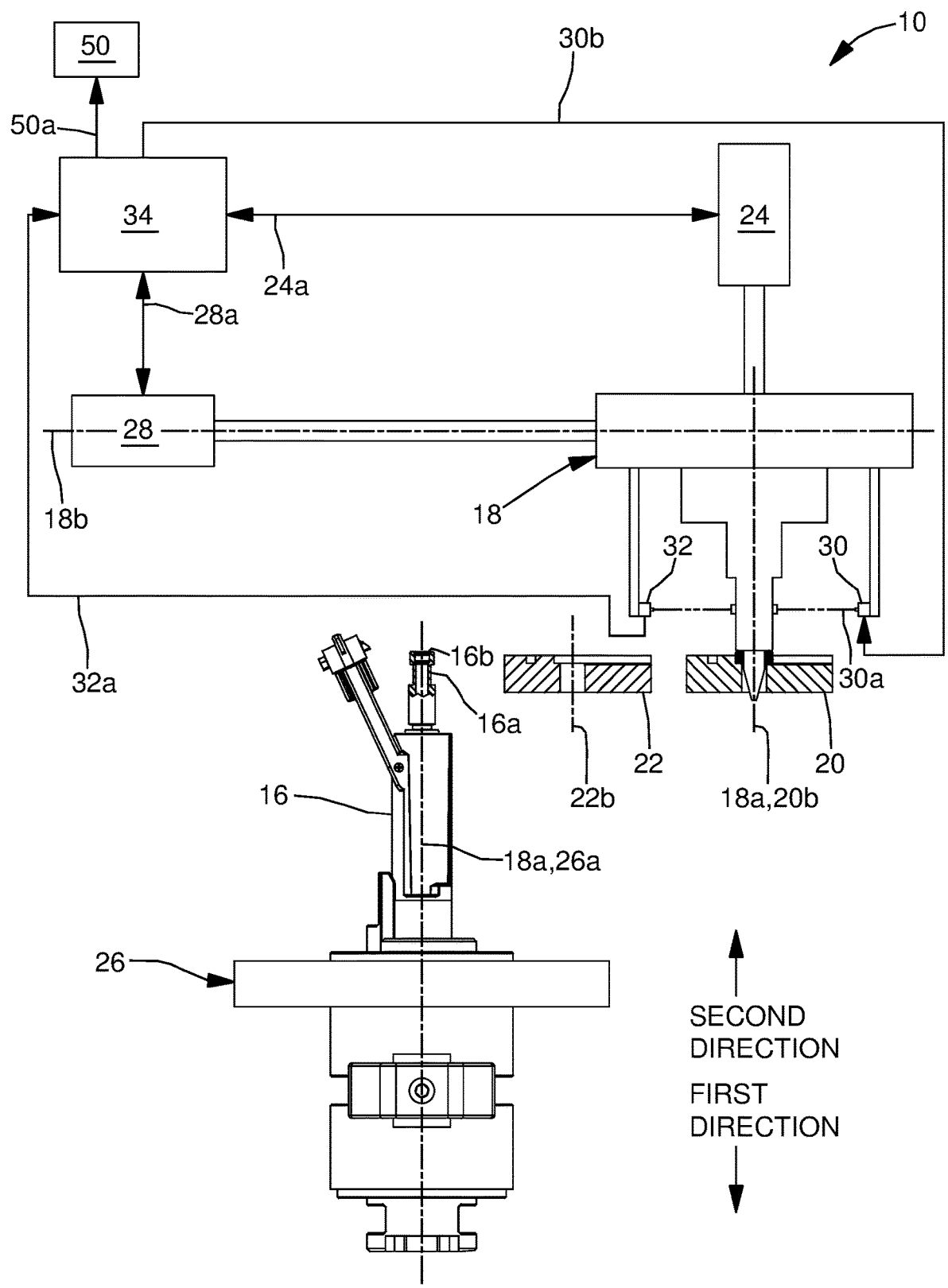
Figure 1F:
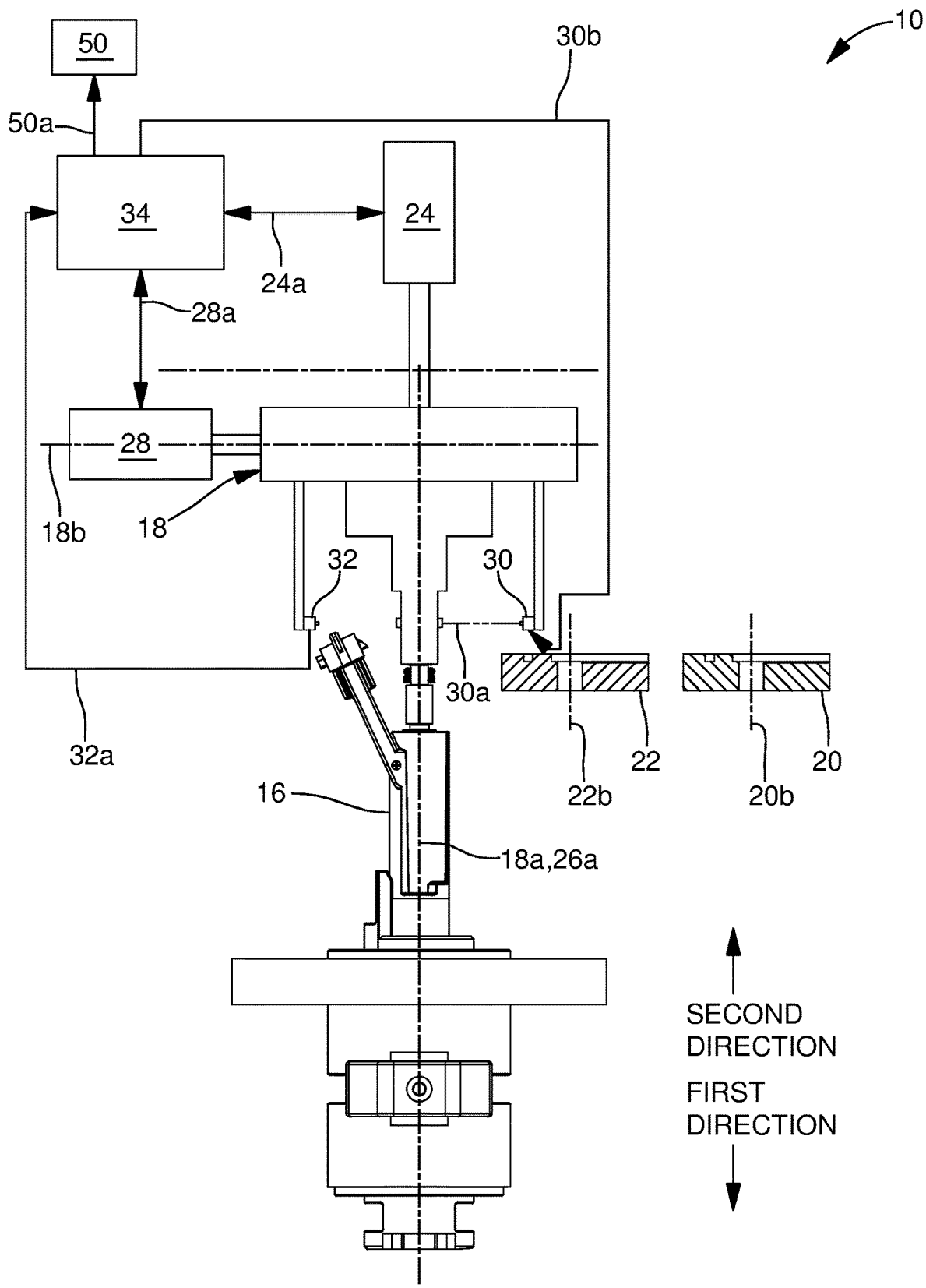

After picking second ring 14, electronic controller 34 instructs first actuator 24 to translate ring handling member 18 along ring handling member first axis 18a in a second direction which is opposite to the first direction and which causes ring handling member 18 to be retracted from second ring holder bore 22a and second ring holder recess 22c, thereby again positioning ring handling member 18 as shown in FIG. 1B. Next, electronic controller 34 instructs second actuator 28 to translate ring handling member 18 along ring handling member second axis 18b until ring handling member first axis 18a is aligned with first ring holder axis 20b, within an allowable tolerance as illustrated in FIG. 1D. Subsequently, electronic controller 34 instructs first actuator 24 to translate ring handling member 18 along ring handling member first axis 18a in the first direction as illustrated in FIGS. 1E and 3E-3H which causes inner mandrel tapered portion 36d to expand first ring 12 outward, and as ring handling member 18 continues to advance in the first direction, first ring 12 is transferred to outer mandrel tapered portion 38f where first ring 12 is further expanded outward and subsequently transferred to outer mandrel central portion 38e.

After picking first ring 12, electronic controller 34 instructs first actuator 24 to translate ring handling member 18 along ring handling member first axis 18a in the second direction which is opposite to the first direction and which causes ring handling member 18 to be retracted from first ring holder bore 20a and first ring holder recess 20c, thereby again positioning ring handling member 18 as shown in FIG. 1D. Next, electronic controller 34 instructs second actuator 28 to translate ring handling member 18 along ring handling member second axis 18b until ring handling member first axis 18a is aligned with part holder axis 26a, within an allowable tolerance, the position ring handling member 18 being now as shown in FIG. 1A. Subsequently, electronic controller 34 instructs first actuator 24 to translate ring handling member 18 along ring handling member first axis 18a which causes inner mandrel 36 to engage fuel injector 16 as illustrated in FIG. 3I. More specifically, fuel injector 16 includes a female feature, namely a fuel injector inlet 16b (labeled in FIG. 1A) which allows fuel to enter fuel injector 16 in operation, within which inner mandrel tapered portion 36d is partially inserted. The tapered nature of inner mandrel tapered portion 36d ensures that ring handling member first axis 18a and part holder axis 26a are coincident when inner mandrel tapered portion 36d engages fuel injector inlet 16b. Engagement of inner mandrel 36 with fuel injector 16 prevents further translation of inner mandrel 36 in the first direction. Consequently, as outer mandrel 38 and ring stripper 40 are further advanced in the first direction along ring handling member first axis 18a, inner mandrel 36 is moved to an inner mandrel second position relative to outer mandrel 38 and ring stripper 40 as shown in FIG. 3J. As inner mandrel 36 moves from the inner mandrel first position to the inner mandrel second position, inner mandrel return spring 44 is further compressed and actuation member 48 slides freely within outer mandrel slots 38g and ring stripper slots 40g which allows outer mandrel 38 to remain in the outer mandrel first position. Also as inner mandrel 36 moves from the inner mandrel first position to the inner mandrel second position, actuation member bore 48a is moved out of alignment with laser beam 30a, thereby preventing laser beam 30a from being received by receiver 32. When inner mandrel 36 has reached the inner mandrel second position, actuation member 48 engages outer mandrel slot second end 38i of each outer mandrel slot 38g. Consequently, as ring stripper 40 is further advanced in the first direction along ring handling member first axis 18a, outer mandrel 38 is moved relative to ring stripper 40 by inner mandrel 36 from the outer mandrel first position to an outer mandrel second position relative to ring stripper 40 as shown in FIG. 3K, thereby further compressing outer mandrel return spring 46.

Figure 3K:
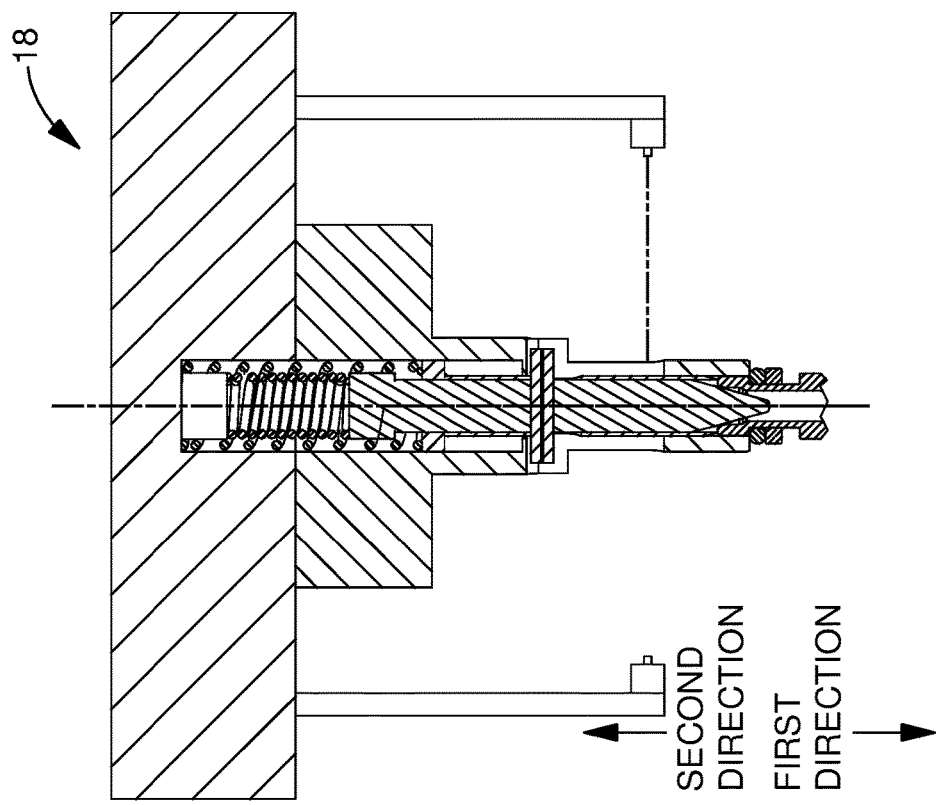

In the course of moving outer mandrel 38 to the outer mandrel second position, inner mandrel 36 is moved to an inner mandrel third position relative to ring stripper 40 as shown in FIG. 3K. It should be noted that have having inner mandrel 36 move outer mandrel 38 from the outer mandrel second position to the outer mandrel second position, outer mandrel 38 is prevented from contacting fuel injector 16 because outer mandrel 38 contacting fuel injector 16 could damage outer mandrel tip 38a which may be delicate due to being tapered to a fine edge. Also in the course of moving outer mandrel 38 to the outer mandrel second position, ring stripper 40 is moved to surround a portion of fuel injector 16, thereby causing ring stripper end face 40a to strip first ring 12 and second ring 14 from outer mandrel 38 and install first ring 12 and second ring 14 in annular groove 16a of fuel injector 16.

After first ring 12 and second ring 14 have been installed on fuel injector 16, electronic controller 34 instructs first actuator 24 to translate ring handling member 18 along ring handling member first axis 18a in the second direction thereby first causing outer mandrel 38 to be moved to the outer mandrel first position by the force of outer mandrel return spring 46 and then next causing inner mandrel 36 to be moved to the inner mandrel first position by the force of inner mandrel return spring 44 which is the reverse of FIGS. 3I-3K. When inner mandrel 36 has returned to the inner mandrel first position, actuation member bore 48a is again aligned with laser beam 30a which allows receiver 32 to receive laser beam 30a. At this point, fuel injector 16 can be removed from part holder 26 and be replaced by another fuel injector 16 which needs first ring 12 and second ring 14 installed thereon and the process of picking and installing first ring 12 and second ring 14 will be repeated. Removal and replacement of fuel injector 16 may be accomplished by automatic equipment (not shown) or by a human operator.

As should now be readily apparent, receiver 32 should receive laser beam 30a in all operating positions of ring handling member 18 except when ring handling member 18 is simultaneously positioned to align ring handling member first axis 18a with part holder axis 26a and to retract inner mandrel 36 into outer mandrel 38, i.e. inner mandrel is not in the first inner mandrel position. If inner mandrel 36 becomes stuck and not able to return to the inner mandrel first position, first ring 12 and/or second ring 14 could be damaged, during the picking operations, by outer mandrel tip 38a which is relatively sharp. However, if inner mandrel 36 does become stuck and not able to return to the inner mandrel first position, logic of electronic controller 34 can determine when receive 32 does not receive laser beam 30a when ring handling member 18 is in any position where it is expected that receiver 32 should receive laser beam 30a. If this condition exists, electronic controller 34 can stop the process to prevent damaging the next first ring 12 and second ring 14 that are to be installed. Furthermore, a malfunction indicator 50 may receive a malfunction indicator signal 50a from electronic controller 34 to provide an alert a human operator of the malfunction so corrective action can be taken.

Ring installation device 10 as described herein allows for simple and efficient installation of first ring 12 and second ring 14 to fuel injector 16 while minimizing the possibility of causing damage to first ring 12 or second ring 14. While ring installation device 10 has been described herein as installing two rings, it should be understood that a lesser number or a greater number may be installed using the same concept.

While this invention has been described in terms of preferred embodiments thereof, it is not intended to be so limited, but rather only to the extent set forth in the claims that follow.

We claim:

1. A ring installation device for installing a ring to a part, said ring installation device comprising:
    an inner mandrel which is tapered in order to expand said ring, said inner mandrel being configured to engage said part;
    an outer mandrel which is tubular such that said inner mandrel is received within said outer mandrel and such that said inner mandrel is moveable within said outer mandrel along an axis, said outer mandrel being configured to receive said ring after being expanded by said inner mandrel; and
    a ring stripper which is tubular such that said outer mandrel is receive within said ring stripper and such that said outer mandrel is moveable within said inner mandrel along said axis, said ring stripper being configured to strip said ring off of said outer mandrel;
    wherein said inner mandrel is moveable along said axis relative to said outer mandrel and said ring stripper from an inner mandrel first position to an inner mandrel second position when said inner mandrel engages said part and said outer mandrel and said ring stripper are moved toward said part along said axis; and
    wherein said outer mandrel is moveable by said inner mandrel along said axis relative to said ring stripper from an outer mandrel first position to an outer mandrel second position when said inner mandrel moves along said axis relative to said ring stripper from said inner mandrel second position to an inner mandrel third position.

2. A ring installation device as in claim 1, further comprising:
    an inner mandrel return spring which biases said inner mandrel toward said inner mandrel first position; and
    an outer mandrel return spring which biases said outer mandrel toward said outer mandrel first position.

3. A ring installation device as in claim 2, wherein said outer mandrel return spring circumferentially surrounds a portion of said inner mandrel.

4. A ring installation device as in claim 2, wherein said inner mandrel return spring and said outer mandrel return spring each have portions located within said ring stripper.

5. A ring installation device as in claim 1, wherein an end face of said outer mandrel axially engages a shoulder of said inner mandrel to limit travel of said inner mandrel relative to said outer mandrel in one direction along said axis.

6. A ring installation device as in claim 5, wherein an outer mandrel shoulder of said outer mandrel axially engages a ring stripper shoulder of said ring stripper to limit travel of said outer mandrel relative to said ring stripper in said one direction along said axis.

7. A ring installation device as in claim 1, wherein:
    said inner mandrel includes an actuation member fixed thereto;
    said outer mandrel includes an outer mandrel slot extending radially therethrough and extending in a direction parallel to said axis from an outer mandrel slot first end to an outer mandrel slot second end, said actuation member extending into said outer mandrel slot.

8. A ring installation device as in claim 7, wherein:
    said actuation member moves freely within said outer mandrel slot when said inner mandrel moves between said inner mandrel first position and said inner mandrel second position, thereby allowing said outer mandrel to remain in said outer mandrel first position when said inner mandrel moves between said inner mandrel first position and said inner mandrel second position; and
    said actuation member engages said outer mandrel slot second end when said inner mandrel is in said inner mandrel second position, thereby causing said actuation member to move said outer mandrel from said outer mandrel first position toward said outer mandrel second position when said inner mandrel moves from said inner mandrel second position toward said inner mandrel third position.

9. A ring installation device as in claim 8, further comprising:
    an emitter configured to emit a laser beam, said emitter being held in fixed position relative to said ring stripper; and
    a receiver which is configured to selectively receive said laser beam, said receiver being held in fixed position relative to said ring stripper;
    wherein said actuation member is tubular, thereby defining an actuation member bore which extends therethrough such that said actuation member bore is aligned with said emitter and said receiver to allow said laser beam to be received by said receiver when said inner mandrel is in said inner mandrel first position and such that said actuation member bore is not aligned with said emitter and said receiver, thereby preventing said laser beam from being received by said receiver when said inner mandrel is not in said inner mandrel first position.

10. A ring installation device as in claim 9, further comprising an electronic controller in electric communication with said receiver such that said electronic controller is configured to receive a receiver signal from said receiver when said emitter receives said laser beam.

11. A ring installation device as in claim 10, further comprising an actuation arrangement in electrical communication with said electronic controller, said actuation arrangement being configured to move said ring stripper along said axis based on input from said electronic controller;
    wherein said electronic controller is configured to receive a signal indicative of a position of said ring stripper along said axis.

12. A ring installation device as in claim 11, wherein said electronic controller is configured to provide an alert when said actuation arrangement is posited at a location in which said receiver expects to receive said laser beam, but does not receive said laser beam.

13. A ring installation device as in claim 11, wherein said actuation arrangement is configured to move said inner mandrel, said outer mandrel, and said ring stripper in a direction which is traverse to said first axis based on input from said electronic controller.

14. A ring installation device as in claim 8, wherein said ring stripper includes a ring stripper slot extending radially therethrough and extending in a direction parallel to said axis from a ring stripper slot first end to a ring stripper slot second end such that said actuation member extends into said ring stripper slot.

15. A ring installation device as in claim 14, wherein said actuation member moves freely within said ring stripper slot when said inner mandrel moves between said inner mandrel first position and said inner mandrel third position.

* * * * *